(12) United States Patent
Ye et al.

(10) Patent No.: US 7,407,202 B2
(45) Date of Patent: Aug. 5, 2008

(54) FOLDABLE ELECTRONIC DEVICE HAVING LATCH MECHANISM

(75) Inventors: Dian-Hong Ye, Shenzhen (CN);
Xiao-Gang Jiang, Shenzhen (CN);
Chien-Li Tsai, Tu-cheng (TW)

(73) Assignees: Hong Fu Jin Precision Industry (Shenzhen) Co., Ltd., Bao-an District, Shenzhen, Guangdong Province (CN); Hon Hai Precision Industry Co., ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/583,459

(22) Filed: Oct. 18, 2006

(65) Prior Publication Data

US 2007/0096474 A1    May 3, 2007

(30) Foreign Application Priority Data

Oct. 25, 2005  (CN) .................... 2005 2 0066459 U

(51) Int. Cl.
*E05C 17/56*   (2006.01)
*E05C 19/10*   (2006.01)
(52) U.S. Cl. ............ 292/251.5; 292/121; 292/DIG. 11; 292/340; 361/683
(58) Field of Classification Search .............. 292/159, 292/251.5, 121, 96, 102, 122, 127, 203, 220, 292/227, DIG. 11; 361/686, 683; 248/552, 248/553; 312/223.1, 223.2; 70/14, 57, 58, 70/63, 67
See application file for complete search history.

(56) References Cited

U.S. PATENT DOCUMENTS

| | | | |
|---|---|---|---|
| 5,497,296 A * | 3/1996 | Satou et al. ................. | 361/681 |
| 5,576,929 A * | 11/1996 | Uchiyama et al. ........... | 361/680 |
| 5,740,012 A * | 4/1998 | Choi .......................... | 361/686 |
| 6,115,239 A | 9/2000 | Kim | |
| 6,122,152 A * | 9/2000 | Goto et al. ..................... | 361/1 |
| 6,517,129 B1 * | 2/2003 | Chien et al. .............. | 292/251.5 |
| 6,659,516 B2 * | 12/2003 | Wang et al. .............. | 292/251.5 |
| 6,927,972 B1 * | 8/2005 | Wang et al. ................. | 361/683 |
| 7,181,238 B2 * | 2/2007 | Chiang .................... | 455/556.1 |
| 2005/0018393 A1 * | 1/2005 | Kuo et al. ................... | 361/683 |
| 2005/0236848 A1 * | 10/2005 | Kim ....................... | 292/251.5 |
| 2006/0038415 A1 * | 2/2006 | Liu et al. ................. | 292/251.5 |
| 2006/0056140 A1 * | 3/2006 | Lev ............................. | 361/683 |
| 2006/0067038 A1 * | 3/2006 | Lev et al. .................... | 361/683 |

* cited by examiner

*Primary Examiner*—Patricia Engle
*Assistant Examiner*—Alyson M Merlino
(74) *Attorney, Agent, or Firm*—Morris Manning Martin LLP; Tim Tingkang Xia, Esq.

(57) ABSTRACT

A latch mechanism for fixing a top member to a base member of a foldable electronic device includes a magnet, a locking member, and a first resilient member. The magnet is for being mounted to the top member of the foldable electronic device. The locking member for being movably received in the base member of the foldable electronic device includes a hook at a top thereof that is made of magnetic material, for engaging with the magnet. The first resilient member is for being mounted between the base member of the foldable electronic device and the locking member.

12 Claims, 8 Drawing Sheets

FOLDABLE ELECTRONIC DEVICE HAVING LATCH MECHANISM

BACKGROUND OF THE INVENTION

1. Field of the Invention

The present invention relates to foldable electronic devices, and particularly to a foldable electronic device having a latch mechanism for readily closing or opening a top member thereof.

2. Description of Related Art

A typical foldable electronic device, such as a notebook computer, includes a base member, and a top member with a rear end pivotably mounted to a rear end of the base member by hinges. Generally, the notebook computer includes a latch mechanism mounted to a front side of the top member for fixing the top member to the base member in a closed position.

A conventional latch mechanism is disclosed in U.S. Pat. No. 6,115,239. The latch mechanism includes a sliding member slidably mounted to a top member of a notebook computer, an operating member mounted to the sliding member, and two springs located between corresponding ends of the sliding member and the top member. The sliding member includes a plurality of L-shaped latches protruding down therefrom for engaging with locking holes of a base member of the notebook computer. When the top member is open, the latches protrude from a corresponding surface of the top member, which impairs the aesthetics of the notebook. Besides, the latches are easily damaged and unable to function anymore due to inadvertent collision on the latches.

What is desired, therefore, is a foldable electronic device having a latch mechanism which more readily allows opening or closing a top member thereof.

SUMMARY OF THE INVENTION

An exemplary latch mechanism for fixing a top member to a base member of a foldable electronic device in a closed position includes a magnet, a locking member, and a first resilient member. The magnet is for being mounted to the top member of the foldable electronic device. The locking member for being movably received in the base member of the foldable electronic device includes a hook at a top thereof that is made of magnetic material, for engaging with the magnet. The first resilient member is for being mounted between the base member of the foldable electronic device and the locking member.

Other advantages and novel features will become more apparent from the following detailed description when taken in conjunction with the accompanying drawings, in which:

DETAILED DESCRIPTION OF THE INVENTION

Figure 1:
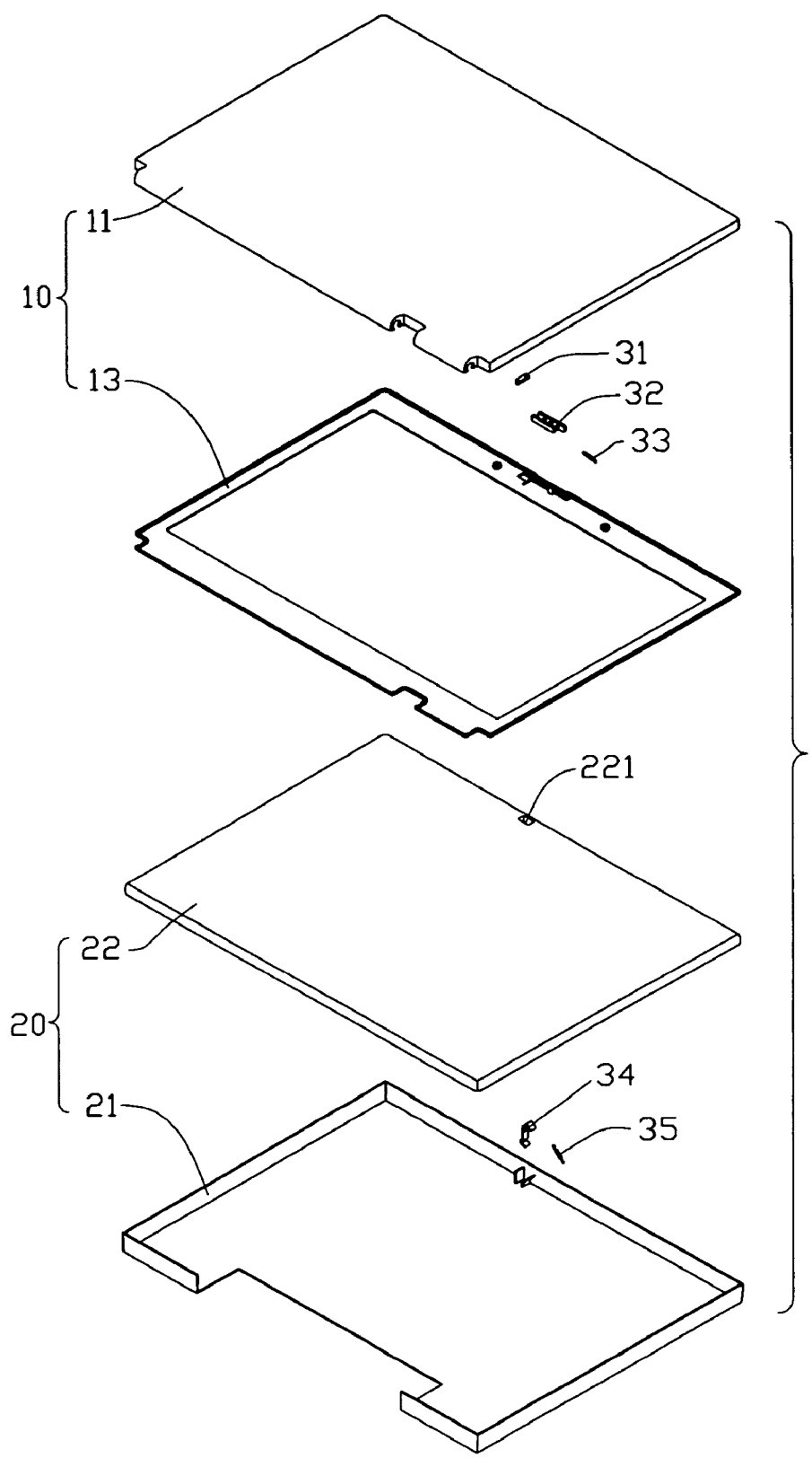
FIG. 1 is an exploded, isometric view of a foldable electronic device in accordance with a preferred embodiment of the present invention, the foldable electronic device includes a top member, a base member, and a latch mechanism.

Referring to FIG. 1, a foldable electronic device in accordance with a preferred embodiment of the present invention is shown. The foldable electronic device of this embodiment is a notebook computer. The notebook computer includes a base member 20, a top member 10 with a rear side pivotably mounted to a corresponding rear side of the base member 20, and a latch mechanism.

Figure 2:
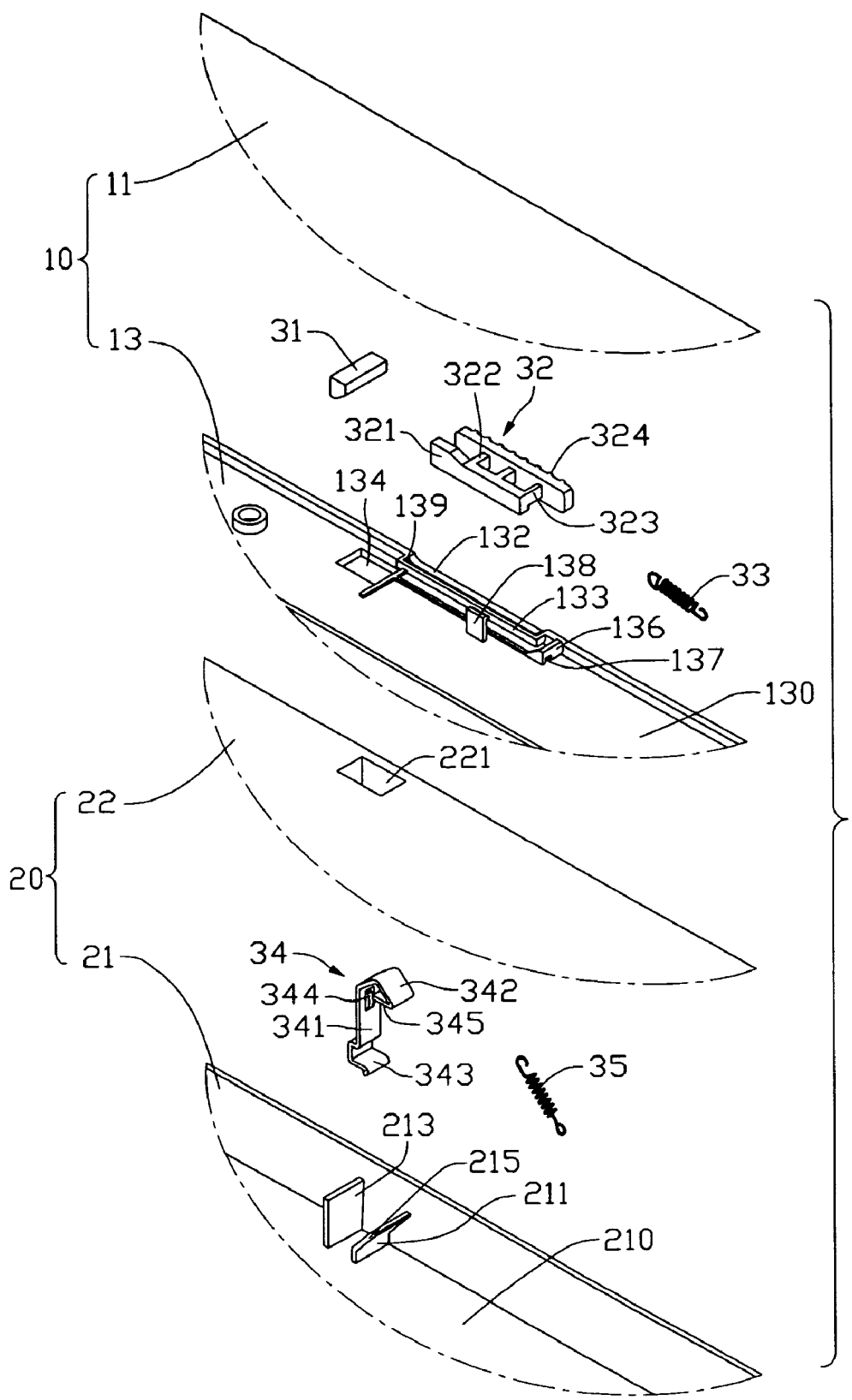
FIG. 2 is similar to FIG. 1, but a partial, enlarged view.
Figure 3:
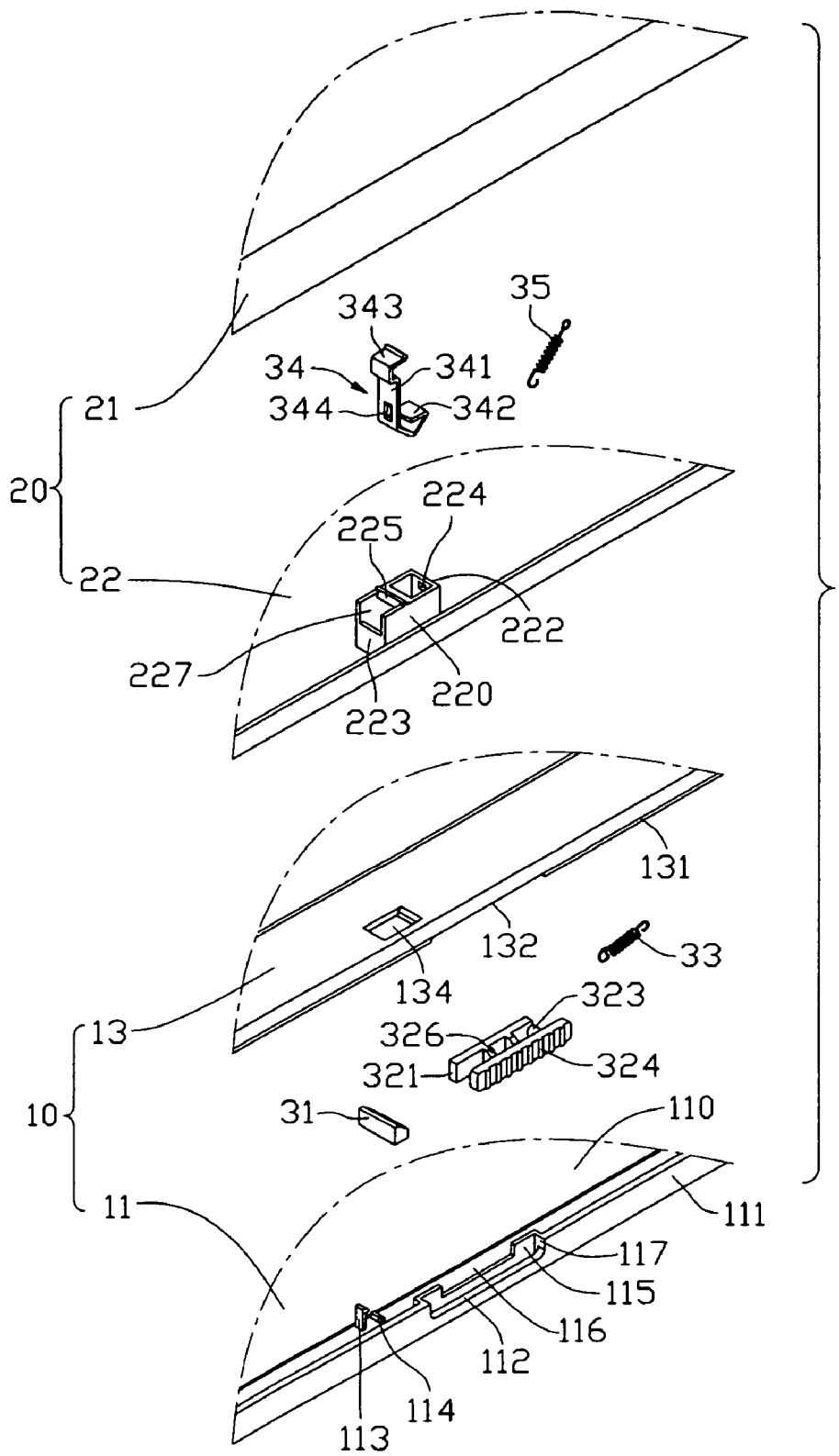
FIG. 3 is similar to FIG. 1, but a partial, enlarged, and inverted view.
Figure 4:
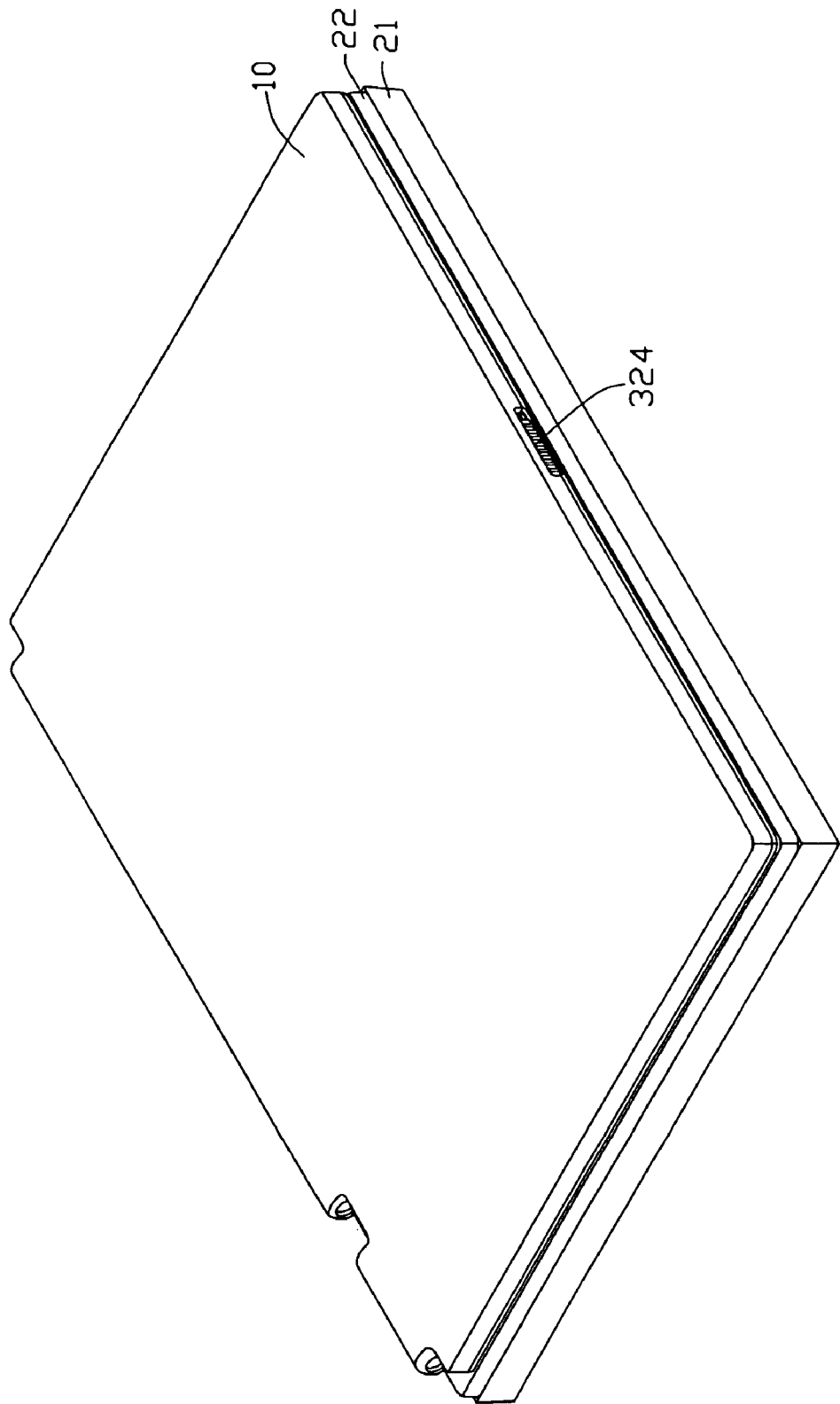
FIG. 4 is an assembled view of FIG. 1, but viewed from another aspect.

Referring also to FIGS. 2 and 3, the base member 20 includes a bracket 21, and a lid 22. The bracket 21 includes a bottom wall 210. A first tab 211 and a second tab 213 extend up from a front side of the bottom wall 210. The first tab 211 includes a slanting surface 215 at a side thereof facing the second tab 213. The lid 22 defines an opening 221 in a front side thereof. A first end board 223 extends down from the lid 22 at an end of the opening 221. A slanting guiding portion 226 (see FIG. 5) extends down from the lid 22 at an opposite end of the opening 221 and toward the first end board 223. A second end board 222 extends down from the lid 22 adjacent the guiding portion 226. A hooking hole 224 is defined in the second end board 222. Two side boards 220, 227 extend down from the lid 22 at opposite sides of the opening 221 respectively, and connect to the first and second end boards 223, 222. A blocking portion 225 parallel to the first and second end boards 223, 222 connects to bottoms of the side boards 220, 227.

The top member 10 includes a cover 11, and a bezel 13. The cover 11 and the bezel 13 are for mounting a liquid crystal display panel (not shown) therebetween. The cover 11 includes a top wall 110, and a front wall 111 extending down from a front side of the top wall 110. A first sliding slot 112 is defined in a middle portion of the front wall 111. Two connecting tabs 117 extend rearward from the front wall 111 at opposite sides of the first sliding slot 112. A connecting board 115 parallel to the front wall 111 extends down from the top wall 110 and connects to distal ends of the connecting tabs 117. A cutout 116 is defined in the connecting board 115. An L-shaped securing portion 113 and an orientating portion 114 extend down from the top wall 110 adjacent the front wall 111 and at a side of the connecting board 115. The bezel 13 includes a body 130, and a front wall 131 extending up from a front side of the body 130. A second sliding slot 132 is defined in a middle of the front wall 131. Two connecting tabs 139 extend rearward from the front wall 131 at opposite sides of the second sliding slot 132 respectively. A connecting board 133 parallel to the front wall 131 extends up from the body 130 and connects to distal ends of the connecting tabs 139. A through-hole 134 is defined in the body 130 at a side of the connecting board 133. A protrusion 136 defining a hooking hole 137 therein protrudes up from the body 130 at an opposite side of the connecting board 133. An L-shaped securing portion 138 extends up from the body 130 adjacent a middle portion of the connecting board 133.

The latch mechanism includes a magnet 31 used as a first engagement means, an operating member 32, a locking member 34 used as a second engagement means, and two resilient members 33, 35. The operating member 32 includes a main part 321, an operating part 324 parallel to the main part 321, two connecting parts 322 connecting with the main part 321 and the operating part 324, and a hooking part 323 connecting with the main part 321 and the operating part 324. Each connecting part 322 includes a slanting guiding portion 326 at a bottom side thereof and adjacent the operating part 324. The locking member 34 made of magnetic material includes a body 341, a hook 342 extending from a top of the body 341, and a U-shaped locating part 343 extending from a distal end of the body 341. A hooking tab 344 is stamped from the body 341 adjacent the hook 342. The hook 342 having a general ridge shape includes a locking portion 345 extending horizontally from a distal end thereof toward the body 341. The resilient members 33, 35 are helical springs.

Referring also to FIGS. 4 to 8, in assembly, the magnet 31 is mounted to the cover 11 with adhesive such as glue and located between the securing portion 113 and the orientating portion 114 of the cover 11. The operating part 324 of the operating member 32 is accommodated in the second sliding slot 132 of the bezel 13. The guiding portions 326 of the connecting parts 322 of the operating member 32 are placed on the connecting board 133 of the bezel 13. The securing portion 138 of the bezel 13 locates the main part 321 of the operating member 32. The resilient member 33 is mounted between the bezel 13 and the operating member 32, with one end thereof engaging with the hooking part 323 of the operating member 32, and the other end thereof engaging in the hooking hole 137 of the protrusion 136 of the bezel 13. The cover 11 is mounted to the bezel 13. The connecting parts 322 and the hooking part 323 of the operating member 32 are received in the cutout 116 of the cover 11. The operating part 324 of the operating member 32 is accommodated in the first sliding slot 112 of the cover 11.

The body 341 and the hook 342 of the locking member 34 are received in the opening 221 of the lid 22. The resilient member 35 is accommodated in the opening 221 of the lid 22 and above the blocking portion 225 of the lid 22. One end of the resilient member 35 hooks the hooking tab 344 of the locking member 34, and the other end of the resilient member 35 engages with the second end board 222 through the hooking hole 224 of the lid 22. The combined assembly of the lid 22, the locking member 34, and the resilient member 35 is mounted to the bracket 21. The locating part 343 of the locking member 34 is accommodated between the first tab 211 and the second tab 213 of the bracket 21 of the base member 20. The hook 342 of the locking member 34 is not penetrating beyond an edge of the opening 221 of the lid 22. The locking member 34 is then in its retractable position to retract entirely in the base member 20.

Figure 5:
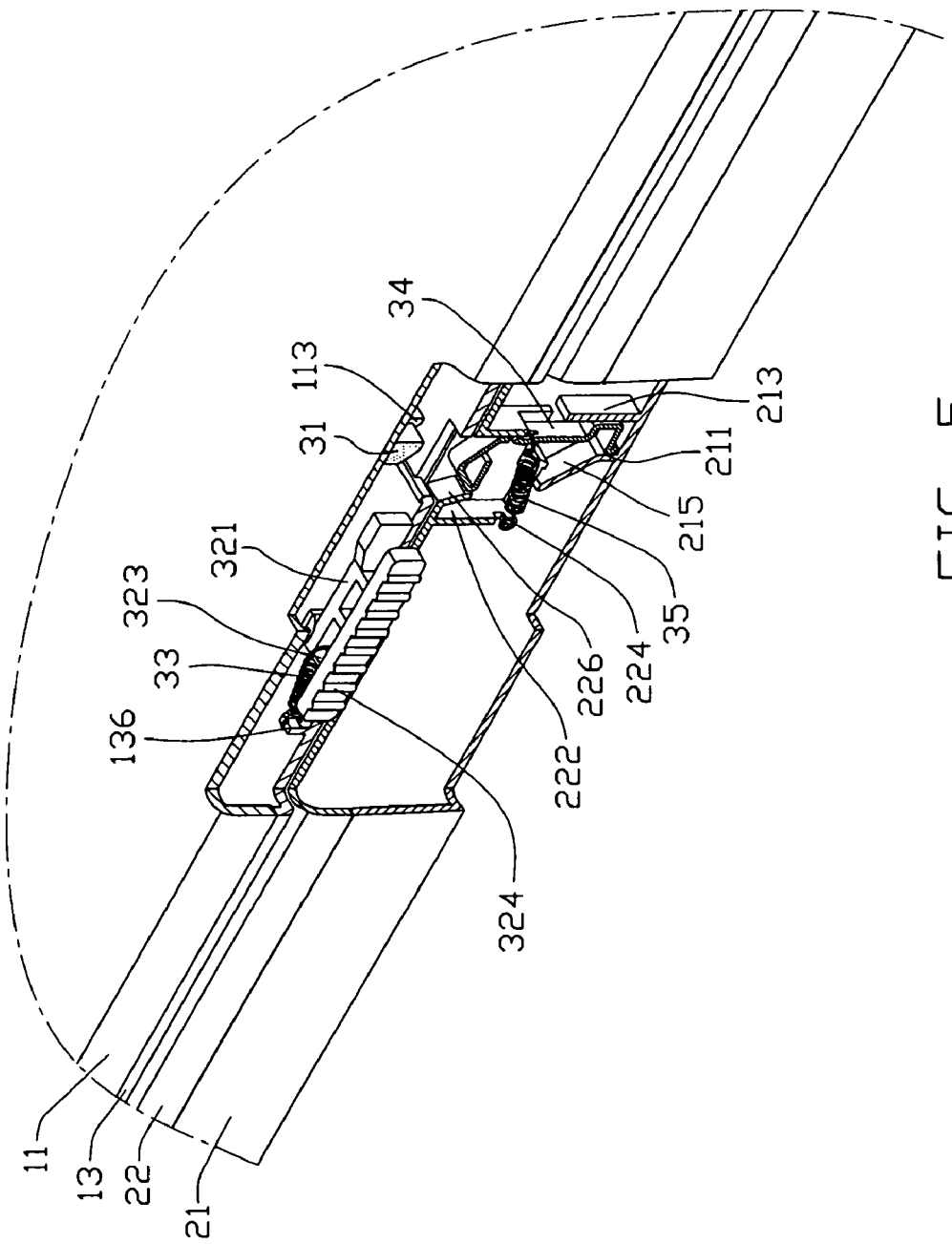
FIG. 5 is an assembled, cutaway view of FIG. 2, but viewed from another aspect, and showing the latch mechanism in an unlocked state.
Figure 6:
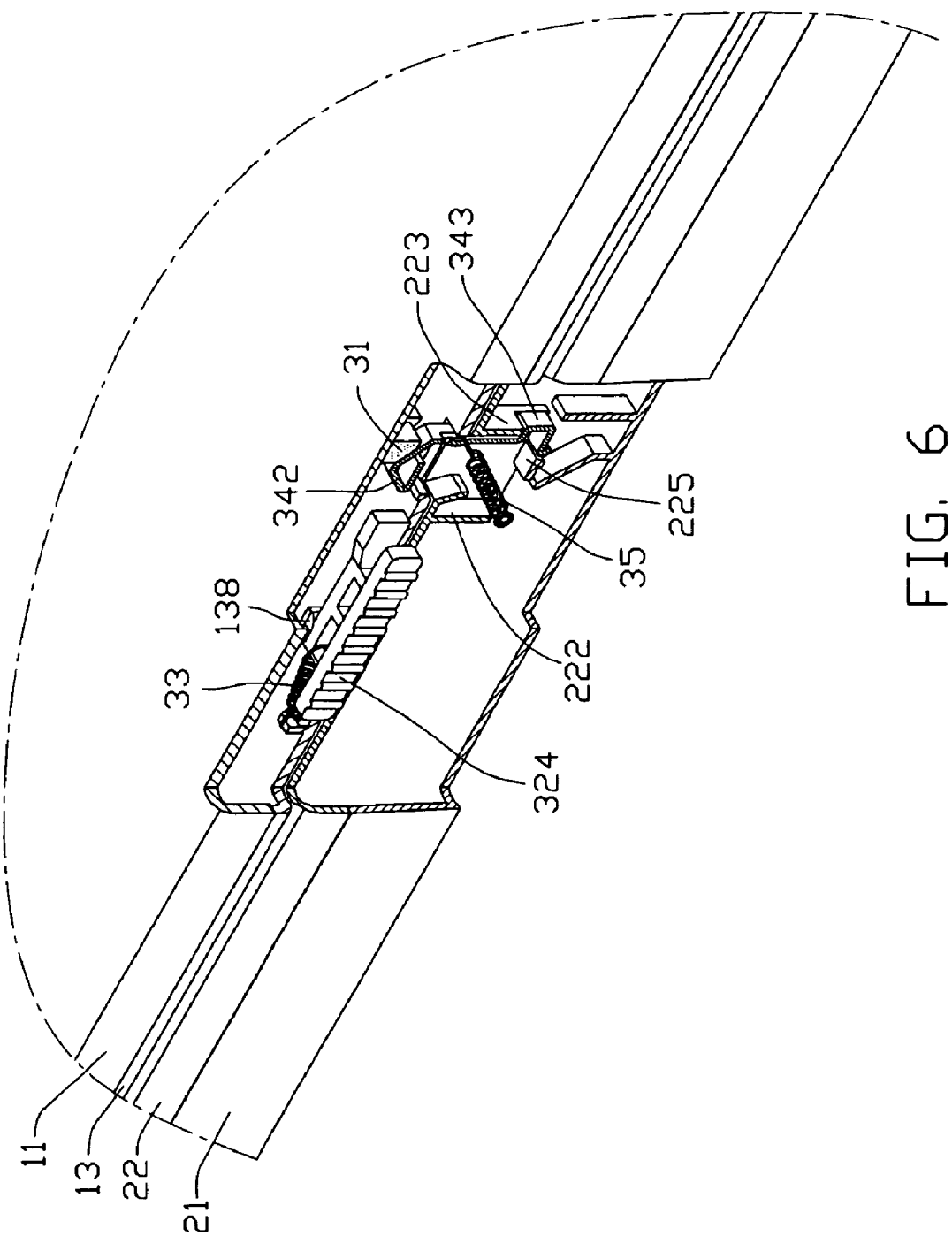
FIG. 6 is similar to FIG. 5, but showing the latch mechanism in a locked state.
Figure 7:
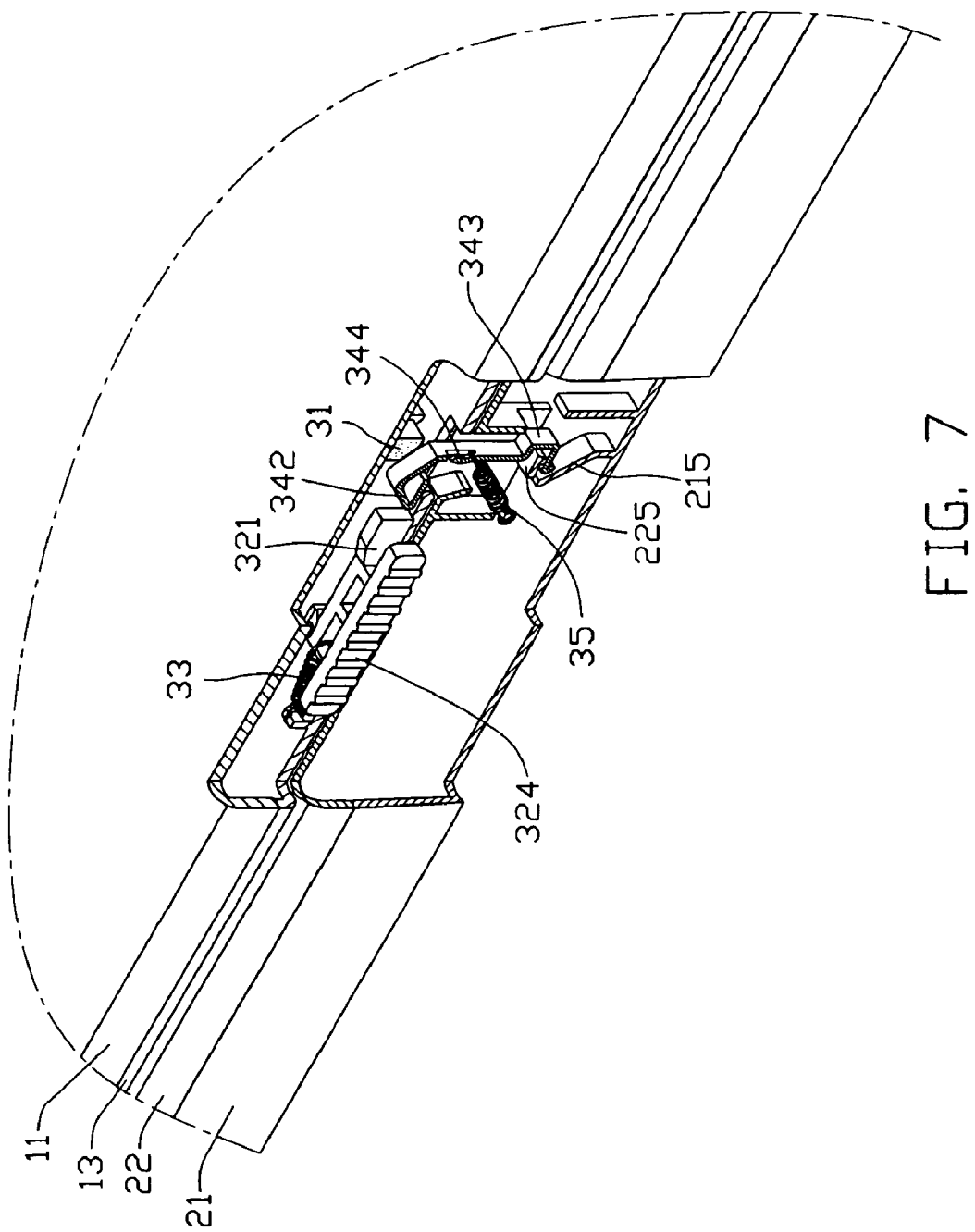
FIG. 7 is similar to FIG. 6, but showing the latch mechanism in a second locked state.
Figure 8:
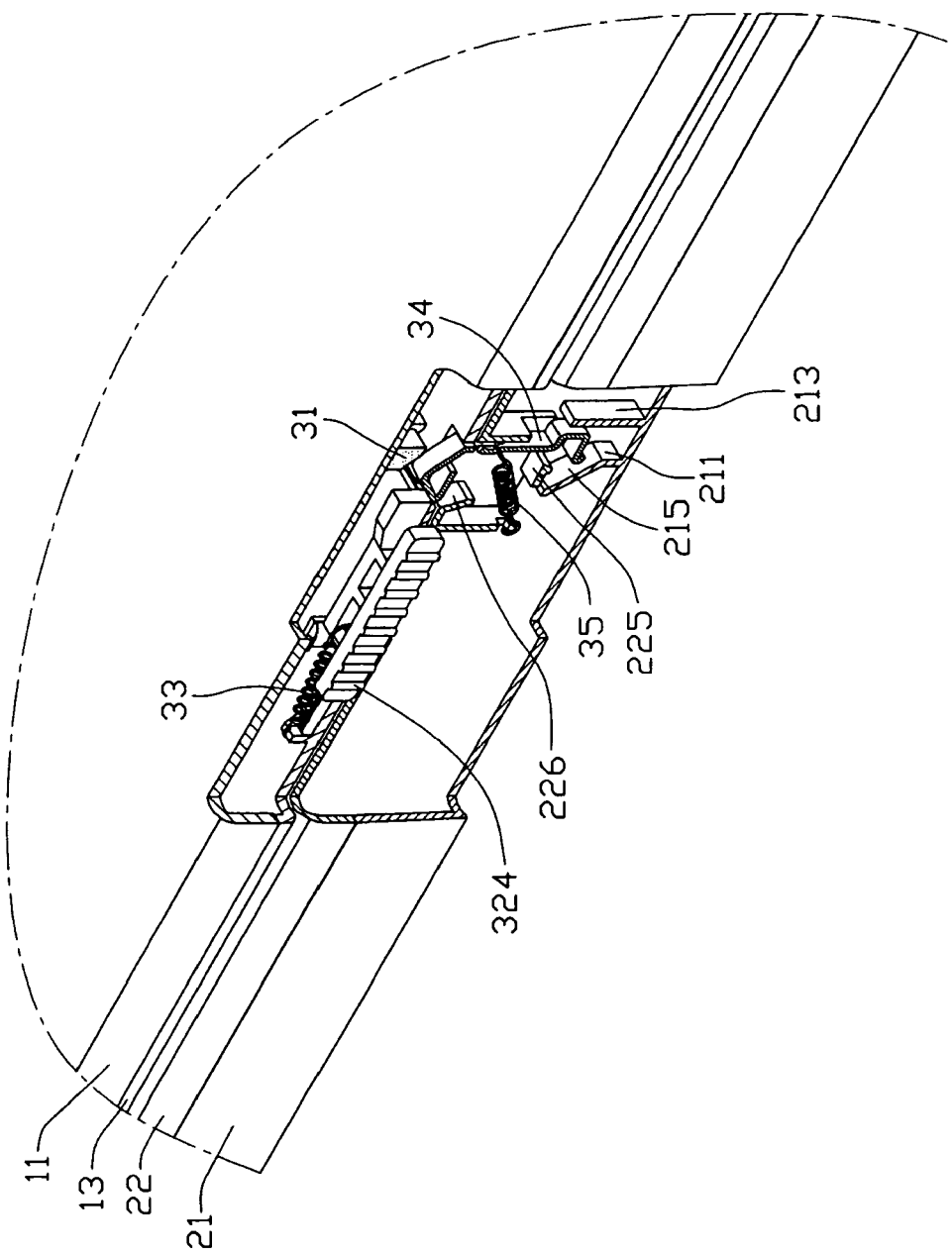
FIG. 8 is similar to FIG. 7, but showing the latch mechanism in a second unlocked state.

In closing the notebook computer, the top member 10 is pivoted toward the base member 20 to a first unlocked position (see FIG. 5). The magnet 31 attracts the locking member 34 to move up till the first end board 223 of the lid 22 contacts with the locating part 343 of the hook 342 of the locking member 34. The locking member 34 is then in its exposable position to expose the locking portion 345 out of the base member 20. The hook 342 passes through the through-hole 134 of the bezel 13 to engage with the magnet 31. The resilient member 35 is deformed. Thus, the top member 10 is closed in a first locked position (see FIG. 6).

In opening the top member 10, the top member 10 is pivoted away from the base member 20. The magnet 31 disengages from the hook 342 of the locking member 42. The locking member 34 is moved down and toward the operating member 32 via the resilient member 35. The locating part 343 of the locking member 34 engages with the blocking portion 225 of the lid 22. The locking portion 345 of the hook 342 is located on the bezel 13. The top member 10 is still closed but in a second locked position (see FIG. 7).

The operating member 32 is moved toward the locking member 34 while operating the operating part 324. The resilient member 33 is deformed. The main part 321 of the operating member 32 pushes the hook 342 of the locking member 34 to move. The locking member 34 moves down via rebounding of the resilient member 35 when the hook 342 thereof moves to align with the through-hole 134 of the bezel 13. The resilient member 33 is restored to drive the operating member 32 to move back. The hook 342 of the locking member 34 moves along the guiding portion 226 of the lid 22. The locating part 343 of the locking member 34 moves along the slanting surface 215 of the bracket 21. The locking member 34 is disengaged from the top member 10 and moves back. Thus, the top member 10 is in a second unlocked position (see FIG. 8) and easily opens.

Additionally, the latch mechanism of the embodiment can be used in other foldable electronic devices, such as a digital video disk (DVD) player.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A latch mechanism for fixing a top member to a base member of a foldable electronic device in a closed position, the latch mechanism comprising:
   a magnet for being mounted to the top member of the foldable electronic device;
   a locking member being slidably received in the base member of the foldable electronic device, the locking member comprising a hook at a top thereof that is made of magnetic material, for being attracted up by the magnet, the hook engaging with the top member when the locking member is in a locking position; and
   a first tension spring, with one end connected to the locking member, the other end connected to the base member of the foldable electronic device, for biasing the locking member down to an unlocking position;
   wherein the locking member further comprises a locating part at a bottom thereof, for being restricted in a horizontal direction by the base member when the locking member is in the unlocking position, and being restricted in an upward direction when the locking member is in the locking position, the locking member still further comprises a body, the hook extends from a top of the body, the locating part extends from a bottom of the body, a tab is stamped from the body configured for engaging with a corresponding end of the first tension spring, the hook having a general ridge shape comprises a locking portion extending horizontally from a distal end thereof toward the body, configured for engaging with the top member of the foldable electronic device by biasing force of the first tension spring when the locking member is in the locking position.

2. The latch mechanism as claimed in claim 1, wherein the locating part has a general U shape.

3. The latch mechanism as claimed in claim 1, further comprising an operating member for being horizontally movably mounted to the top member of the foldable electronic device to drive the hook of the locking member to move to disengage with the top member of the foldable electronic device.

4. The latch mechanism as claimed in claim 3, wherein the operating member comprises a main part located in the top member of the foldable electronic device, an operating part parallel to the main part and located outside of the top member, and a connecting part connecting to the main part and the operating part, the main part is for driving the locking member, the operating part is for facilitating manual operation.

5. The latch mechanism as claimed in claim 4, further comprising a second tension spring connecting the operating member and the top member of the foldable electronic device, wherein the operating member further comprises a hooking part connecting to the main part and the operating part, for engaging with a corresponding end of the second tension spring.

6. A foldable device, comprising:
a base member;
a top member, with one end thereof pivotably mounted to a corresponding end of the base member; and
a locking mechanism comprising:
a magnet mounted to the top member;
a locking member being slidably received in the base member, the locking member comprising a hook at a top thereof that is made of magnetic material, for being attracted up by the magnet, the hook engaging with the top member when the locking member is in a locking position; and
a first tension spring, with one end connected to the locking member, the other end connected to the base member, the first tension spring biasing the locking member down to an unlocking position, or to hook the top member to further ensure the locking position;
wherein the base member comprises a bracket, and a lid mounted to the bracket, a first tab and a second tab extend up from a front side of the bracket, the locking member further comprises a locating part at a bottom thereof, for being located between the first and second tabs, the first tab comprises a slanting surface at a side thereof facing the second tab, for the locating part of the locking member moving upward therealong.

7. The foldable device as claimed in claim 6, wherein the locking member still further comprises a hook at a top thereof, the lid defines an opening in a front side thereof, for the hook of the locking member passing through.

8. The foldable device as claimed in claim 7, wherein a first end board extends down from the lid at an end of the opening, for restricting the locating part of the locking member when closing the top member.

9. The foldable device as claimed in claim 8, wherein a slanting guiding portion extends down from the lid at an opposite end of the opening and toward the first end board, for the hook of the locking member sliding therealong.

10. The foldable device as claimed in claim 7, wherein the top member comprises a bezel, and a cover mounted to the bezel, the bezel defines a through-hole in a front side thereof, for the hook of the locking member passing through and engaging with an edge surrounding the through-hole.

11. The foldable device as claimed in claim 10, further comprising an operating member being horizontally movably mounted to the top member to drive the locking member to move to disengage with the edge surrounding the through-hole, and a second tension spring connecting the top member and the operating member.

12. A foldable device, comprising:
a base member;
a top member, with one end thereof pivotably mounted to a corresponding end of the base member; and
a locking mechanism comprising:
a magnet mounted to the top member;
a locking member being slidably received in the base member, the locking member comprising a hook at a top thereof that is made of magnetic material, for being attracted up by the magnet, the hook engaging with the top member when the locking member is in a locking position; and
a first tension spring, with one end connected to the locking member, the other end connected to the base member, the first tension spring biasing the locking member down to an unlocking position, or to hook the top member to further ensure the locking position;
wherein the base member comprises a bracket, and a lid mounted to the bracket, a first tab and a second tab extend up from a front side of the bracket, the locking member further comprises a locating part at a bottom thereof, for being located between the first and second tabs, the locking member still further comprises a hook at a top thereof, the lid defines an opening in a front side thereof, for the hook of the locking member passing through, a first end board extends down from the lid at an end of the opening, for restricting the locating part of the locking member when closing the top member.

* * * * *